United States Patent Office 2,878,822
Patented Mar. 24, 1959

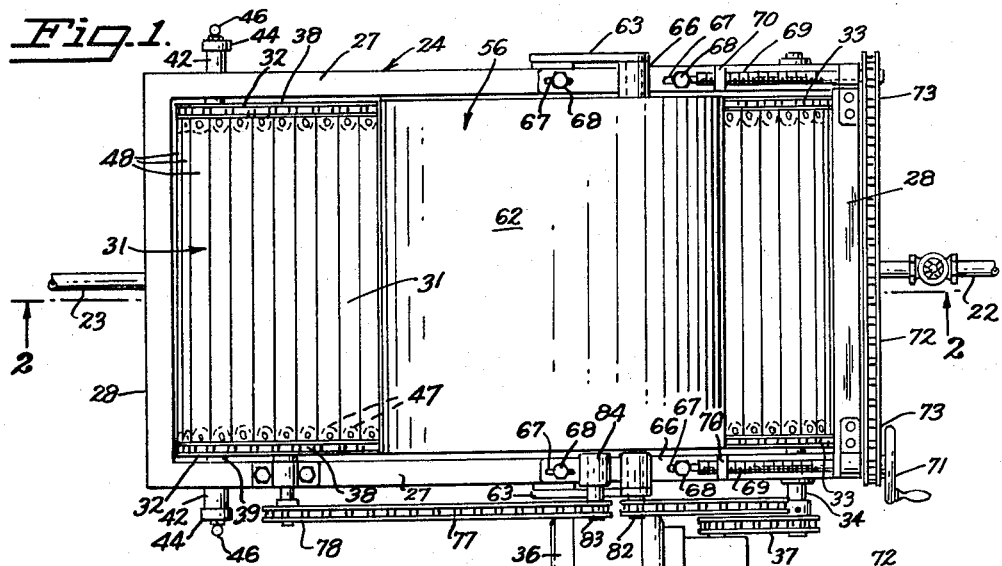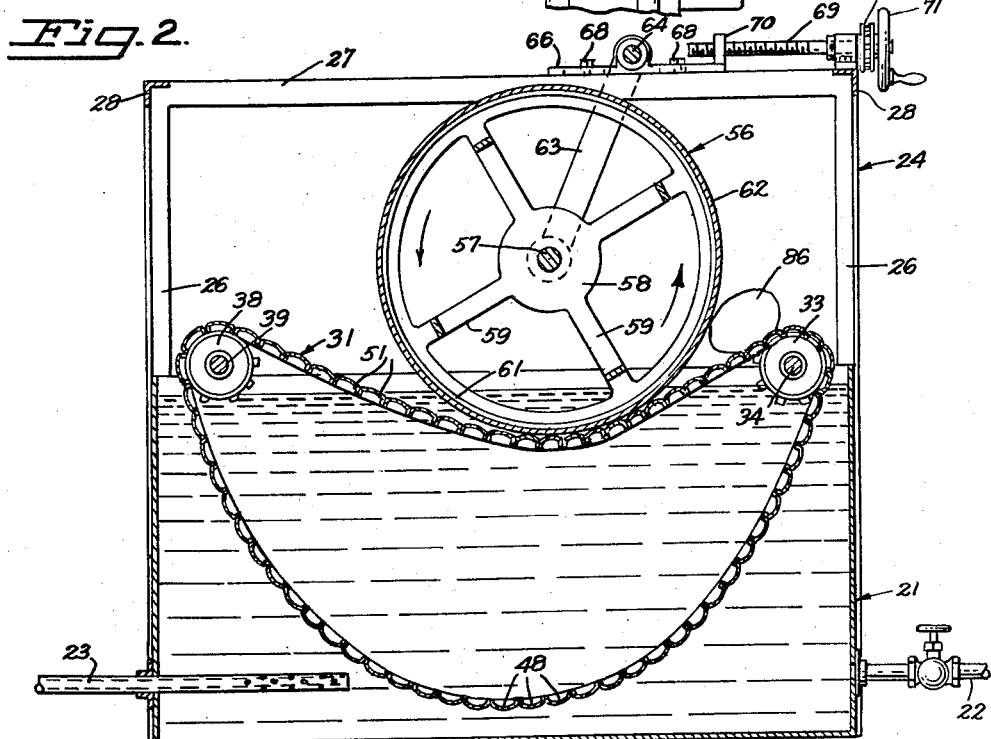

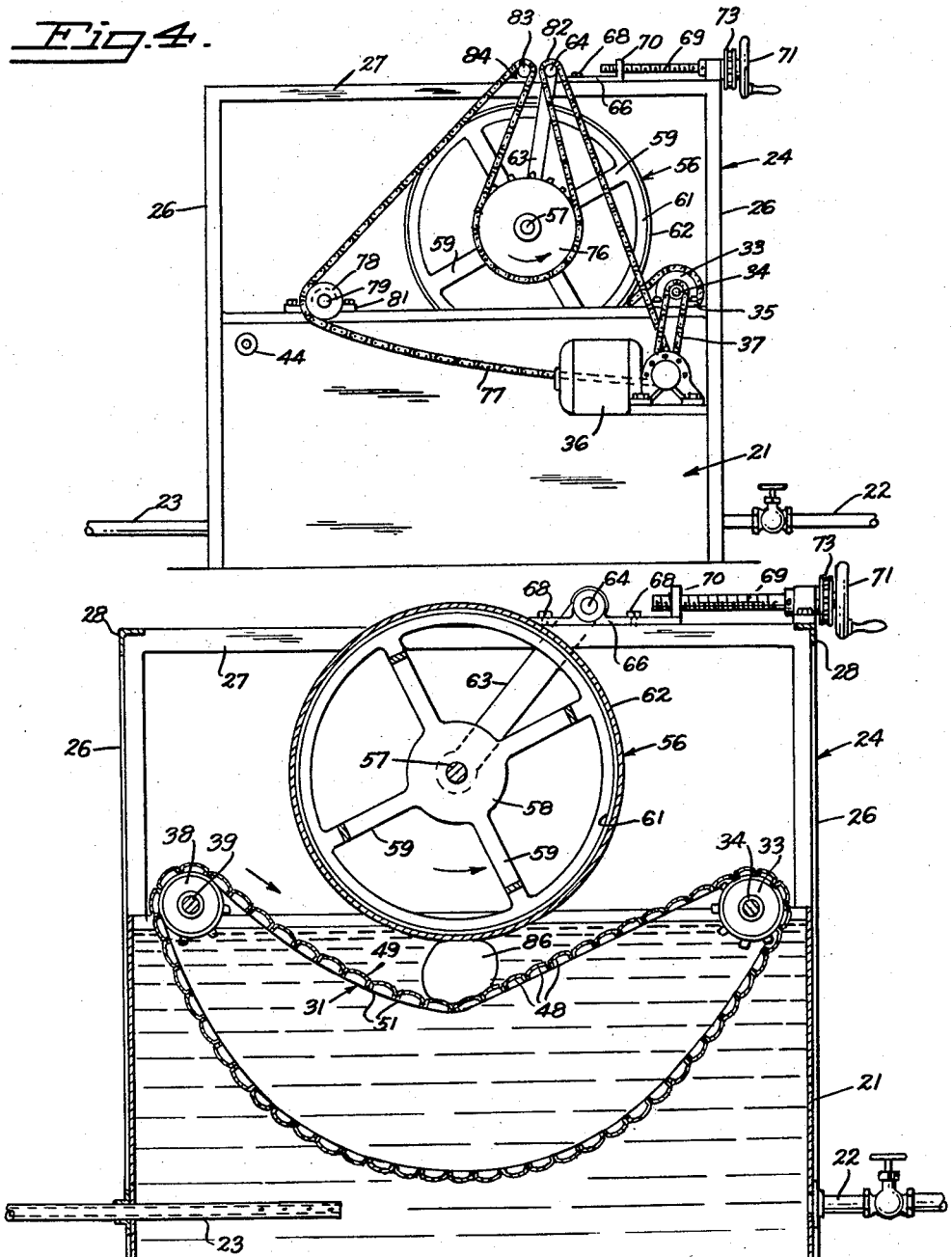

2,878,822

SHRINK TANK FOR SUBMERGING PACKAGED ARTICLES

Frank H. Ine, Milwaukee, Wis.

Application November 22, 1955, Serial No. 548,386

1 Claim. (Cl. 134—126)

This invention relates to a new and improved shrink tank for submerging in hot water and shrinking plastic-wrapped articles.

More particularly the invention relates to a shrink tank in which packages wrapped in shrinkable plastic bags or coverings may be immersed in order to uniformly shrink the plastic into intimate contact with the article encased. Poultry, meat products and other objects, particularly irregularly shaped objects, are frequently encased in plastic bags made of such substances as a copolymer vinylidine and vinyl chloride, one commercial material of this type being sold by the Dow Chemical Company under the trade name saran. After the contents have been encased within such plastic material, the bags are sprayed or doused with warm water in order to shrink the plastic into close conformity to the shape of the packaged article.

One means to shrink the plastic is to provide a shrink tank containing warm water and a conveying means in which the individual packages are transported through the tank and discharged after the plastic has shrunk. The present invention provides a continuous belt-type conveyor on which the packages are deposited and carried from an intake end to a discharge end. Supported above the conveyor is a wheel mounted so that it can swing in an arc upwardly and downwardly to conform to a required path which will insure that the packages are submerged in water as they are transported on the conveyor and also to insure that the packages will properly discharge from the belt after they have been transported to the discharge end of the tank. Accordingly one of the principal objects of the present invention is to provide means of the type mentioned above which insures submersion as well as proper discharge of packaged articles conveyed through a shrink tank.

Another object and advantage of the present invention is the provision of means which will insure that the plastic covering is not torn or otherwise damaged by rough handling while the packages are passing through the shrink tank.

Other objects of the present invention will become apparent upon reading the following specification and referring to the accompanying drawings in which similar characters of reference represent corresponding parts in each of the several views.

In the drawings:

Fig. 1 is a top plan of the device;

Fig. 2 is a longitudinal sectional view taken substantially along the line 2—2 of Fig. 1;

Fig. 3 is a fragmentary, transverse vertical sectional view taken substantially along the line 3—3 of Fig. 2;

Fig. 4 is a side elevation of the device in reduced scale; and

Fig. 5 is a view similar to Fig. 2 showing the position of the various parts while a package is being transported through the tank.

The present invention employs a rectangular, preferably insulated, watertight tank 21 of sufficient size to accommodate the largest packages to be immersed therein and the conveying mechanism hereinafter described. A water inlet pipe 22 furnishes water to the tank 21 as required. In order to maintain the tank at the required temperature, a perforated steam pipe 23 is also provided. Above the tank 21 is a superstructure 24 comprising vertical legs 26 at each of the four corners of the tank 21, the legs 26 being joined together by longitudinal horizontal members 27 and transverse horizontal members 28, in order to provide a rigid supporting structure for the purpose which hereinafter appears.

Substantially entirely within the tank 21 is a conveyor 31 which is driven by means of longitudinally extending continuous chains 32 on each of the side edges thereof. At the forward end of the tank, the chains are driven by drive sprockets 33 mounted on transverse drive shaft 34 which is supported by means of pillow blocks 35 on the upper edge of tank 21. Shaft 34 is driven by an electric motor 36 mounted exteriorly of the tank, there being a chain drive 37 connecting motor 36 to shaft 34. The opposite ends of chains 32 are supported by idler sprockets 38 mounted on transverse idler shaft 39 journaled in mountings 42 welded to the outside of the tank with bushings 41 interposed between shaft 39 and mountings 42. Washers 43 on shaft 39 prevent sprockets 38 from rubbing against mounting 42. The outer ends of mountings 42 are closed off by caps 44 provided with grease fittings 46. It will be noted that idler sprockets 38 are freely rotatable on shaft 39 and that shaft 39 is also rotatable within its mounting 42. Further, chains 32 are considerably longer than necessary and thus are free to sag in order to conform to the shape of the objects being transported. This degree of movement may be seen by contrasting the position of the conveyor 31 in Fig. 2 with that shown in Fig. 5.

The conveying surface upon which the packages being transported rest consists of a plurality of narrow, thin, transversely extending straps or slats 48, each end of which is connected to inwardly extending extensions or lugs 47 on the links of chains 32. The means whereby straps 48 are attached to link extensions 47 is subject to variation, but as shown on the accompanying drawings, comprises machine screws 52. Each strap 48 is curved in cross-section, having a crown 49 which extends upwardly on the upper stretch of the chain and edges 51 which are downwardly extending and hence do not come in contact with the package and accordingly do not cut or otherwise damage the protective covering thereof. In commercial practice the straps themselves may be made of 18 gauge stainless steel approximately 1½ inches in width.

Above the tank and mounted in superstructure 24 is a wheel 56 of enlarged diameter and wide enough to extend approximately the full length of the tank. Wheel 56 is supported by a transverse, horizontal shaft 57, there being a hub 58 receiving the shaft 57 with radially extending spokes 59 extending outwardly to a cylindrical drum 61 which is enveloped by a covering 62 of rubber or other similar protective material. It will be noted, particularly with reference to Fig. 2, that the ends of wheels 56 are substantially open so that water is not trapped therein. Shaft 57 is supported by a pair of links 53 on either side, the upper ends of links 53 being received by link pivot shafts 54 which are located in shaft brackets 66 on either side of the machine. Brackets 66 are provided with longitudinally extending slots 67 through which pass bolts 68 which slidably mount said brackets 66 on longitudinal superstructure members 27. The forward ends of brackets 66 are turned upwardly and threaded to provide nuts 70 which receive horizontal, longitudinally extending adjustment screws 69. The outer end of one such adjustment screw 69 is provided with a hand wheel 71, The other adjustment screw 69 is turned in synchronism by means of a chain 72 which passes around sprockets 73 on both screws 69. Thus by turning the hand wheel 71, the longitudinal position of brackets 66 relative to the tank 21 may be adjusted. When a large package, such as a turkey, is being treated, the bracket and wheel 56 are moved rearwardly or to the left, as shown in Fig. 1. On the other hand, when a small package is being treated, the hand wheel 71 is turned so that wheel 56 is moved forwardly, or to the right, thereby bringing the wheel closer to the discharge end of the conveyor 31 whereby proper discharge of the package from the conveyor is assured by virtue of the fact that the wheel exerts a virtual pushing force on the package as it clears the discharge end of the tank.

Wheel 56 and conveyor 31 are driven by motor 36, the peripheral speeds of each being substantially identical. Accordingly, an enlarged sprocket 76 is provided on shaft 57 and driven by chain 77. As shown particularly in Fig. 4, a spacer idler 78 carried by stud shaft 79 is mounted on pillow blocks 81 adjacent the rearward end of tank 21. A pair of guide idlers 82 and 83 are mounted on superstructure 24, one of the guide sprockets 82 being located on link pivot shaft 64 and the other being mounted on pillow block 84 on bracket 66. The mounting thus provided enables wheel 56 to be driven despite its swinging movement from the position shown in Fig. 2 to that shown in Fig. 5.

In operation, a package 86 is deposited manually or by conveying means (not shown) on the top stretch of conveyor 31 at the intake side of the device, which, as shown in Fig. 2, is the left side. Motor 36 causes the upper stretch of conveyor 31 to move to the right as shown, and this carries package 86 into the tank. By reason of the loose mounting of sprockets 38, conveyor 31 sags, thereby immersing the package in the water in tank 21. The movement of conveyor 31 and the natural tendency of the package to roll to the lowest level, cause the package to move downwardly as it moves toward the center of the tank. Meanwhile wheel 56 engages the top of the package and holds the same in firm engagement with conveyor 31 so that it is first immersed in water and then lifted by the conveyor to the righthand, or discharge side of the tank.

It is one of the features of this invention that wheel 56 is mounted rearwardly of its pivot shafts 64 and hence the weight of wheel 56 tends to move it toward the right, as viewed in Fig. 2. Such movement of the wheel tends to push packages off the discharge end of the conveyor and into a receptacle or discharge conveyor (not shown).

As thus described, it will be seen that packages are carried through the shrink tank and fully and completely immersed therein without possibility that the packages will fail to discharge properly. In addition, damage to the package or its covering is prevented by virtue of the unique construction of the stainless steel arcuate slat type conveyor belt, in conjunction with the mechanical arrangement between the conveyor and wheel whereby the relative spacing between said conveyor and wheel is subject to automatic variation corresponding to size of the packages handled. More specifically, both the top stretch of the conveyor belt (due to differences in the amount of sag thereof) and the pivotally supported wheel are adapted to move independently upwardly or downwardly relative to one another and corresponding to the size of packaged article passing between the conveyor and wheel.

Although the foregoing invention has been described in some detail by way of illustration and example for purposes of clarity of understanding, it is understood that certain changes and modifications may be practiced within the spirit of the invention and scope of the appended claim.

What is claimed is:

In a shrink tank, a longitudinal conveyor means in said tank for carrying articles from a position adjacent a first end of said tank outwardly at the second end of said tank, said conveyor comprising a continuous web, means for driving said web, means supporting one end of said web operable to permit relative sagging movement of the top stretch of said web, a drum above said tank having at least a portion of its periphery within said tank above said conveyor means, means pivotally supporting said drum for swingable movement above and within the vertical plane of conveyor path movement, and means for rotating said drum and driving said conveyor whereby the peripheral speeds of said drum and conveyor are substantially identical.

References Cited in the file of this patent
UNITED STATES PATENTS

| | | |
|---|---|---|
| 94,954 | Greenwood | Sept. 21, 1869 |
| 125,430 | Balsly | Apr. 9, 1872 |
| 319,028 | Rochlitz | June 2, 1885 |
| 493,335 | Lambach | Mar. 14, 1893 |
| 498,371 | Wadsworth | May 30, 1893 |
| 830,933 | Skinner | Sept. 11, 1906 |
| 1,294,335 | Fluharty | Feb. 11, 1919 |
| 1,381,107 | Cwirko | June 14, 1921 |
| 1,641,515 | Williams | Sept. 6, 1927 |
| 1,672,327 | Lormor | June 5, 1928 |
| 2,628,705 | Kline | Feb. 17, 1953 |